(12) United States Patent
Smith et al.

(10) Patent No.: US 6,425,553 B1
(45) Date of Patent: Jul. 30, 2002

(54) PIEZOELECTRIC ACTUATORS FOR CIRCULATION CONTROLLED ROTORCRAFT

(75) Inventors: James E. Smith, Bruceton Mills; John L. Loth, Morgantown, both of WV (US); Robert P. M. Craven, Cookeville, TN (US); Robert Bond, Blossburg, PA (US)

(73) Assignee: West Virginia University, Morgantown, WV (US)

( * ) Notice: Subject to any disclaimer, the term of this patent is extended or adjusted under 35 U.S.C. 154(b) by 20 days.

(21) Appl. No.: 09/641,699

(22) Filed: Aug. 18, 2000

Related U.S. Application Data
(60) Provisional application No. 60/150,065, filed on Aug. 20, 1999.

(51) Int. Cl.$^7$ ................................................. B64C 1/38
(52) U.S. Cl. ...................................................... 244/130
(58) Field of Search ................................ 244/204, 205, 244/206, 207, 130

(56) References Cited

U.S. PATENT DOCUMENTS

| | | | | |
|---|---|---|---|---|
| 3,005,496 A | * | 10/1961 | Nichols | |
| 4,137,008 A | * | 1/1979 | Grant et al. | 416/20 R |
| 4,200,252 A | * | 4/1980 | Logan et al. | 244/17.19 |
| 4,508,314 A | * | 4/1985 | Hemme | 251/11 |
| 4,626,171 A | * | 12/1986 | Carter, Sr. et al. | 416/90 A |
| 4,966,526 A | * | 10/1990 | Amelio et al. | 416/90 R |
| 5,626,312 A | * | 5/1997 | Head | 244/75 R |
| 5,632,841 A | | 5/1997 | Hellbaum et al. | 156/245 |
| 6,142,425 A | * | 11/2000 | Armanios et al. | 244/207 |

* cited by examiner

Primary Examiner—Peter M. Poon
Assistant Examiner—Kevin Jakel
(74) Attorney, Agent, or Firm—Steptoe & Johnson PLLC

(57) ABSTRACT

A dynamic fluid control surface, e.g., a rotor blade of a helicopter, having a blowing slot extending the entire length of the leading and trailing edges of the dynamic fluid control surface, an internal chamber containing a pressurized fluid, e.g., air, and one or more piezoelectric actuators positioned along the length of the blowing slots and connected to the internal chamber. The piezoelectric actuators are controlled by a computer system to regulate the flow of fluid released through the blowing slot. There may be one or more blowing slots on either just the trailing edge of a dynamic fluid control surface or on both the leading edge and the trailing edge of the dynamic fluid control surface.

44 Claims, 3 Drawing Sheets

PIEZOELECTRIC ACTUATORS FOR CIRCULATION CONTROLLED ROTORCRAFT

CROSS REFERENCE TO RELATED APPLICATIONS

This application claims the benefit of Application No. 60/150,065, filed Aug. 20, 1999.

BACKGROUND OF THE INVENTION

1. Field of the Invention

This invention relates to circulation controlled rotorcraft, and in particular, to a rotorcraft having a fluid dynamic control surface with a blowing slot and a means for controlling the rate and volume of fluid through the blowing slot.

2. Related Art

It is a well known aviation principal that increasing the lift capability and/or lift distribution of an aircraft's wings results in the aircraft being able to handle heavier payloads. As a result, aircraft wings have been the focus of redesign efforts in order to increase their lift capabilities. The goal of this research was to increase take-off weight limits or provide the aircraft with flight and control characteristics suitable for a greater range of environmental or mission related flight requirements.

Recent research developments have incorporated blowing slots upstream of a rounded trailing edge of an aircraft's wings to provide increased lift and/or control of the aircraft. It has been shown that a jet of air exiting at the proper location on a lifting surface, e.g., a wing, either increases the effective wing area and helps minimize the boundary layer separation near the trailing edge of the wing, thereby increasing lift, or increases the lift force by Coanda turning along the rounded trailing edge.

While this research effort enhanced the lift capability of fixed wing aircraft, it fell short of providing the same advantages for rotorcraft, e.g., helicopters, for several reasons. The inboard portion of the rotor blades (wings) of a conventional rotorcraft in flight experience a period of reverse flow during part of the cycle. Therefore, by adding an extra blowing slot along the inboard section of the rotor blade, the rotor blade's leading edge can be reversed as needed to provide lift over the entire length of the rotor blade, that is, to increase lift during an entire rotation of a rotor blade.

To accomplish this increase in lift of a rotor blade, an elaborate and complex air handling valving system was incorporated into the rotor hub mechanism of a rotorcraft. Positioning the air valves in the rotor hub mechanism resulted in greatly increased drag and power waste during the period of filling and emptying the rotor blade with compressed air.

It was found that subsonic blowing velocities were needed over most of the entire length of a rotor blade; that it was nearly impossible to effectively distribute the compressible air over the entire length of the rotor blade; that an uninterrupted uniform blowing slot was needed; that to control the blowing rate during an entire revolution of a rotor blade, either the blowing pressure or the blowing slot width must be dynamically controllable to achieve the needed balance of lifting moment about the rotor hub. In addition, all attempts of controlling the blowing velocities along the entire length of a blowing slot included the use of a mechanical cam—and all failed.

To balance the lifting moment, the blowing slot flowing pressure must be dynamically controlled. This was found to be a very power wasting procedure because the air was supplied intermittently to the rotor blade, so that the average pressure is only half the supply pressure. To achieve this dynamic control, a rotor hub was designed having a large number of control valves around its perimeter to regulate the amount of blowing air to the front and rear compartments of a rotor blade during its rotation. The volume of the rotor blade compartments acted as large capacitors. Therefore, at a high frequency of rotation, the blowing slot's outflow rate becomes continuous and only somewhat modulated even when the air supplied by the valves is intermittent. In addition, all attempts to control the flow of air at the rotor hub failed because air is a compressible fluid and, as such, the fluid control needs to occur along the entire length of the blowing slot and not at the rotor hub. Therefore, adequate control of the air pressure along the length of the blowing slot of the rotating rotor blades was never achieved.

Therefore, there is a need for a fluid, e.g., air, handling and control system for a rotorcraft that controls a rotor blade's leading edge and trailing edge as needed to provide lift over the entire length of the trailing edge, thereby providing the correct amount of lift during an entire rotation of the rotor blade. There is a further need for a fluid handling and control system for a rotorcraft that provides dynamic control of the pressure of a fluid, e.g., air, through a blowing slot along the entire length of a blowing slot in the rotor blade to avoid operating the blowing slot at only half the air supply pressure.

SUMMARY OF THE INVENTION

The present invention solves the problems associated with the use of a blowing slot in a dynamic fluid control surface, e.g., a rotor blade, of a rotorcraft having the control valves that provide the circulation control positioned upstream of the rounded trailing edge. The present invention is a dynamic fluid control surface having a blowing slot along the length of a trailing edge and one or more piezoelectric actuators positioned along the length of the blowing slot to open and close the blowing slot as needed. The piezoelectric actuators are controlled by a computer system such that they are engaged and disengaged as needed during the rotation of the dynamic fluid control surface.

There are many advantages with positioning the piezoelectric actuators along the length of a blowing slot of a dynamic fluid control surface. First, the scope of the present invention may be incorporated into a dynamic fluid control surface, i.e., rotor blade, of a rotorcraft as well as with any vehicle having a dynamic fluid control surface, including fixed wing aircraft, watercraft, or others.

Other specific examples of such advantages are described in terms of a rotorcraft, e.g., a helicopter, incorporating the present invention: The rotor lift capability is enhanced. If sufficient rotor blade torque is provided by the blowing slot then the need for a tail rotor is eliminated. Loading symmetry and no rolling movements during a forward flight permits lower rotor blade tip speed ratios than conventional rotor blades. Less lift is required from a rotor blade in the reverse flow region. The rotorcraft may be steered (forwards, sideways, up, and down) by varying the piezoelectric actuators' gaps and opening times along the length of the blowing slot of the rotor blade, thereby eliminating the complex mechanical control system in conventional helicopters. Icing problems along a rotorblade are eliminated as the blowing fluid, e.g., exhaust air, from a gas-turbine compressor bleed is sufficient to warm and de-ice the rotor blades. The simple see-saw suspension of the rotor blades assures zero roll moment about the rotor hub. A stored gas, e.g., hydrogen peroxide plus a catalist, within the rotorcraft can provide sufficient working fluid for an emergency landing such as in case of an engine failure.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Figure 1:
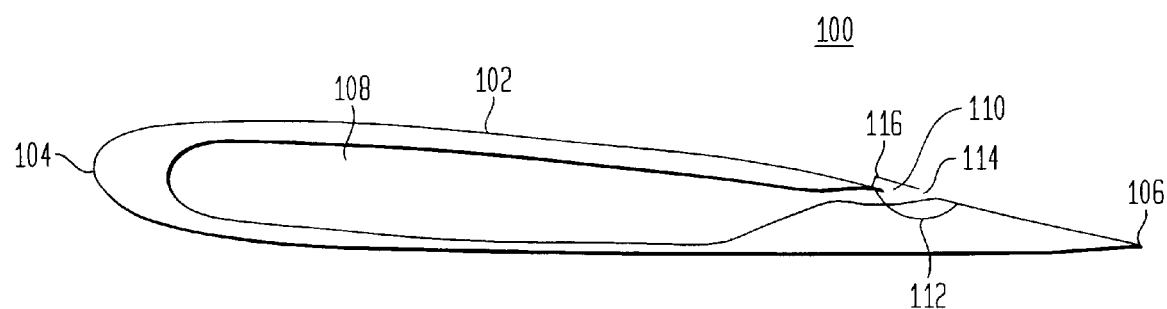
FIG. 1 is a planar cross sectional view of a dynamic fluid control surface of the present invention.
Figure 2:
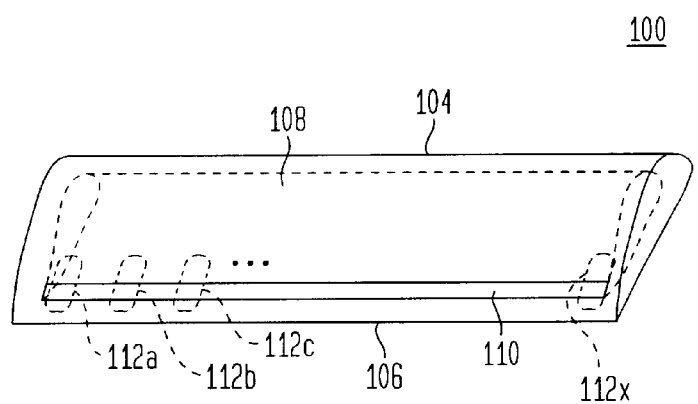
FIG. 2 is a perspective view of the dynamic fluid control surface.

A dynamic fluid control surface, e.g., a rotor blade, 100 of the present invention is shown in FIGS. 1 and 2. The present invention is described in terms of a rotor blade of a helicopter for convenience purpose only. It would be readily apparent to one of ordinary skill in the relevant art(s) to incorporate the present invention with all vehicles having dynamic fluid control surfaces, e.g., fixed wing aircraft, watercraft, and the like. Therefore, for further convenience purpose only, the term "dynamic fluid control surface" includes, but is not limited to, a rotor blade, a fixed wing, the tails on a hydrofoil, or a watercraft keel, fin or propeller.

The dynamic fluid control surface 100 comprises an exterior surface 102 having a leading, or first, edge 104 and a trailing, or second, edge 106, an internal chamber 108 in which a pressurized fluid is contained, and, in the preferred embodiment, a single continuous blowing slot 110, having an opening 114, positioned along the trailing edge 106 of the dynamic fluid control surface 100 and connected to the internal chamber.

The fluid used in the present invention is described in terms of air due to the preferred embodiment being directed to helicopters, but this is for convenience purpose only. The fluid could also be water if the vehicle at issue is a hydrofoil or a propeller of a watercraft. Therefore, it would be readily apparent to one of ordinary skill in the relevant art to use any comparable compressible fluid. In the preferred embodiment, the internal chamber 108 contains the fluid (air) which is the exhaust air from the jet engine of the helicopter.

The release of the fluid through the opening 114 of the blowing slot 110 is controlled via one or more piezoelectric actuators 112a–x positioned in proximity of the blowing slot 110. If one piezoelectric actuator 112 is used, it is strategically positioned along the blowing slot 110, such as half way along the length of the blowing slot 110. In the preferred embodiment, a plurality of piezoelectric actuators 112a–x, about 100, are positioned in a linear sequence in proximity to the blowing slot 110, e.g., at multiple points uniformly spaced along the blowing slot 110, and a means for controlling the piezoelectric actuators 112a–x is connected to each of the piezoelectric actuators 112a–x to regulate the flow of fluid through the blowing slot 110. Also in the preferred embodiment, the piezoelectric actuators 112a–x are controlled via a computer system which is described in greater detail below.

The preferred piezoelectric actuator 110 is the NAS-DRIVE™ actuator described in U.S. Pat. No. 5,632,841, but this is for convenience only. It would be readily apparent to one of ordinary skill in the relevant art(s) to incorporate any conventional piezoelectric actuator with the present invention.

The present invention is described in terms of one blowing slot 110 along the trailing edge 106 of a dynamic fluid control surface 100 for convenience purpose only. The present invention also may comprise a plurality of blowing slots 110 arranged in a linear alignment, staggered, or configured in a matrix arrangement having one or more rows and columns along the trailing edge 106 through which the fluid is released. When a plurality of blowing slots 110 are used, the piezoelectric actuators 112a–x can either work in concert such that all blowing slots 110 behave in a uniform manner at the same time, or, the piezoelectric actuators 112a–x can work independent of each other, resulting in each blowing slot 110 operating independent of the others. In an alternative embodiment, the blowing slots 110 may be grouped into one or more blowing slot groupings, wherein the piezoelectric actuators 112a–x of each blowing slot grouping are controlled independent of the piezoelectric actuators 112a–x of the other blowing slot groupings.

When having independent control of the piezoelectric actuators 112a–x along a blowing slot 110, or of blowing slot groupings of piezoelectric actuators 112a–x, it is possible to steer the rotorcraft by selectively engaging and disengaging certain piezoelectric actuators 112a–x, or blowing slot groupings of piezoelectric actuators 112a–x, at certain times. The resulting thrust from releasing fluid at specific points along the dynamic fluid control surface 100 causes the rotorcraft to be moved forward, sideways, up or down as desired.

The length of the blowing slot(s) 110 may also be variable. In the preferred embodiment, a single contiguous blowing slot 110 is located in proximity to the trailing edge 106 of the dynamic fluid control surface 100 having a length equal to about the length of the trailing edge 106. In alternative embodiments, the blowing slot(s) 110 may be of any length, e.g., a plurality of short blowing slots 110 arranged along the entire trailing edge 106 of the dynamic fluid control surface 100, or a single blowing slot 110 having a short length, e.g., about one half the length of the trailing edge 106 of the dynamic fluid control surface 100 and positioned anywhere along the trailing edge 106.

In the preferred embodiment, the piezoelectric actuators 112a–x control the flow of fluid through the blowing slot 110 by controlling the size and/or shape of the opening 114, or the width, of the blowing slot 110. In this embodiment, the flow of fluid from the internal chamber 108 remains constant but is controlled at its point of exit through the blowing slot 110. The shape of the opening 114 of the blowing slot 110 does not stay constant or a pre-defined fixed size, but rather, the shape or size of the opening 114 of the blowing slot 110 is changed by the one or more piezoelectric actuators 112a–x. The piezoelectric actuators 112a–x are attached to a movable flap 116 that covers and uncovers the opening 114 of the blowing slot 110, thereby changing the size of the opening 114 of the blowing slot 110. When the piezoelectric actuators 112a–x are engaged to open the blowing slot 110, the flap 116 is retracted such that the opening(s) 114 of the blowing slot(s) 110 are widened and more fluid is released through the blowing slot(s) 110. Conversely, when the piezoelectric actuators 112a–x are engaged to close the blowing slot 110, the flap 116 is extended over the opening 114 of the blowing slot 110, thereby closing the opening(s) 114 of the blowing slot(s) 110 such that less (or even no) fluid is released through the blowing slot(s) 110.

Alternatively, the piezoelectric actuators 112a–x are attached to the inside of the dynamic fluid control surface 100 adjacent to the blowing slot 110. Therefore, when engaged, the piezoelectric actuators 112a–x themselves function as the flap 116 for covering and uncovering the opening 114 of the blowing slot 110.

In an alternative embodiment, the piezoelectric actuators 112a–x function as valves to control the flow of fluid through the blowing slot 110. The piezoelectric actuators 112a–x are located at any position between the internal chamber 108 and the blowing slot(s) 110 wherein they regulate the amount and rate of fluid that passes through the blowing slot(s) 110. In this embodiment, the size, or diameter, of the opening(s) 114 and the shape of the blowing slot(s) 110 remain a constant, predefined fixed size. The piezoelectric actuators 112a–x regulate the flow of fluid prior to the fluid being released through the opening(s) 114 of the blowing slot(s) 110. When the piezoelectric actuators 112a–x are engaged to open, more fluid is released through the piezoelectric actuators 112a–x and through the blowing slot 110. Conversely, when the piezoelectric actuators 112a–x are engaged to close, less fluid is released through the piezoelectric actuators 112a–x and through the blowing slot 110.

Figure 3:
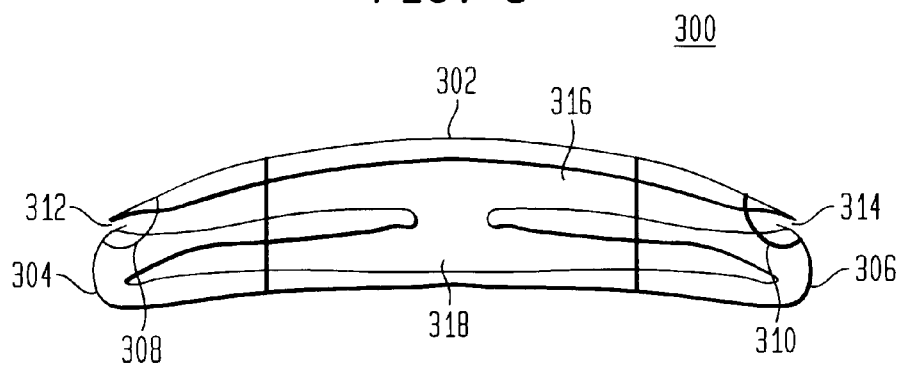
FIG. 3 is a planar cross-sectional view of an alternative dynamic fluid control surface of the present invention.

FIG. 3 depicts a planar cross-sectional view of an alternative embodiment of a dynamic fluid control surface 300 of the present invention. As above, this dynamic fluid control surface 300 has an exterior surface 302, a leading edge 304, a trailing edge 306, and an internal chamber 316 in which a fluid is contained. In this embodiment, however, one or more blowing slots 312, 314 may be positioned along the both edges 304, 306 of a dynamic fluid control surface 300. Specifically, there is a leading blowing slot 312 located along the leading edge 304 of the dynamic fluid control surface 300 and a trailing blowing slot 314 located along the trailing edge 306 of the dynamic fluid control surface 300 wherein both the leading blowing slot 312 and the trailing blowing slot 314 are connected to the internal chamber 316. Further, there is one or more leading piezoelectric actuators 308 for regulating the flow of fluid through the leading blowing slot 312 and one or more trailing piezoelectric actuators 310 for regulating the flow of fluid through the trailing blowing slot 314. The leading piezoelectric actuators 308 and the trailing piezoelectric actuators 310 are positioned and controlled as the piezoelectric actuators 112a–x of the preferred dynamic fluid control surface 100 described above.

In another alternative embodiment, the dynamic fluid control surface 300 comprises a reserve tank 318 of fluid to use as a backup for the internal chamber 316. In addition, the fluid from the internal chamber 316 and/or from a reserve tank 318 may be used as a means for de-icing the dynamic fluid control surface 300. In the preferred embodiment, the fluid is air that originates from the exhaust of the jet engine of the helicopter. The air passes from the reserve tank 318 through the internal chamber 316 such that the internal chamber 316 acts as storage. Because the air coming from the engine is hot, this hot air de-ices the dynamic fluid control surface 300 as it passes through the blowing slots 312, 314.

Figure 4:
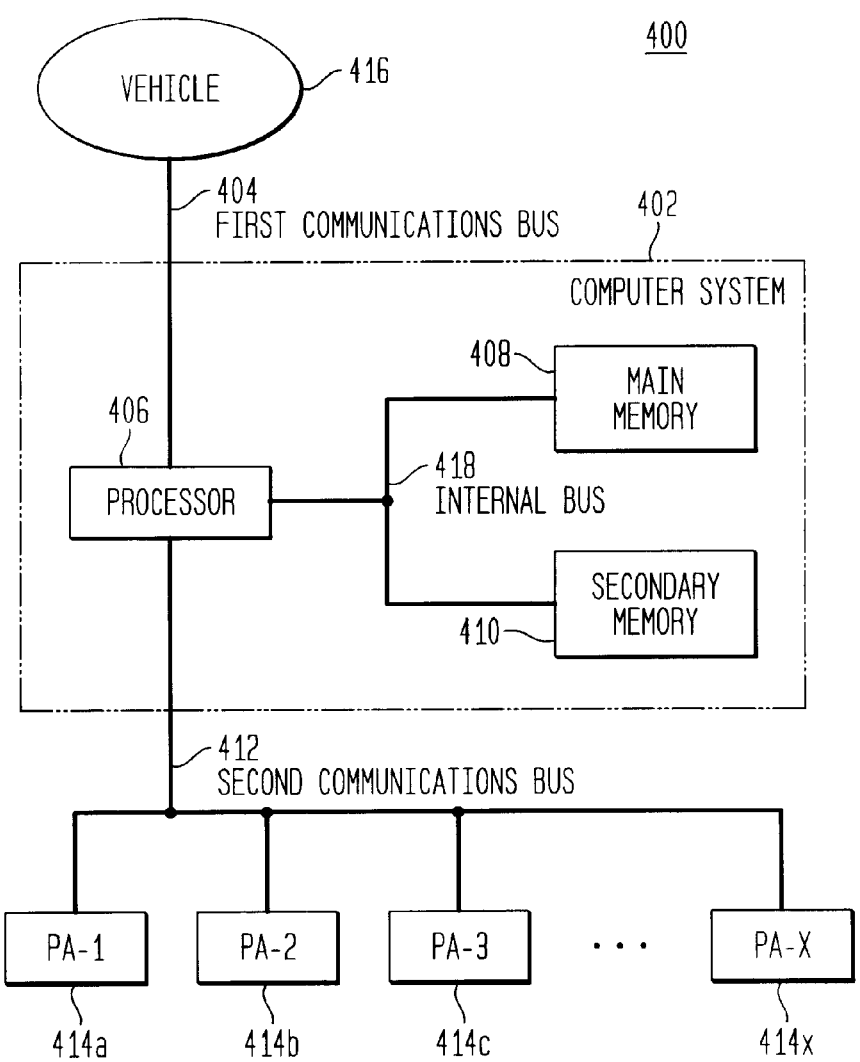
FIG. 4 is a block diagram of an exemplary computer system used in the present invention.
Figure 5:
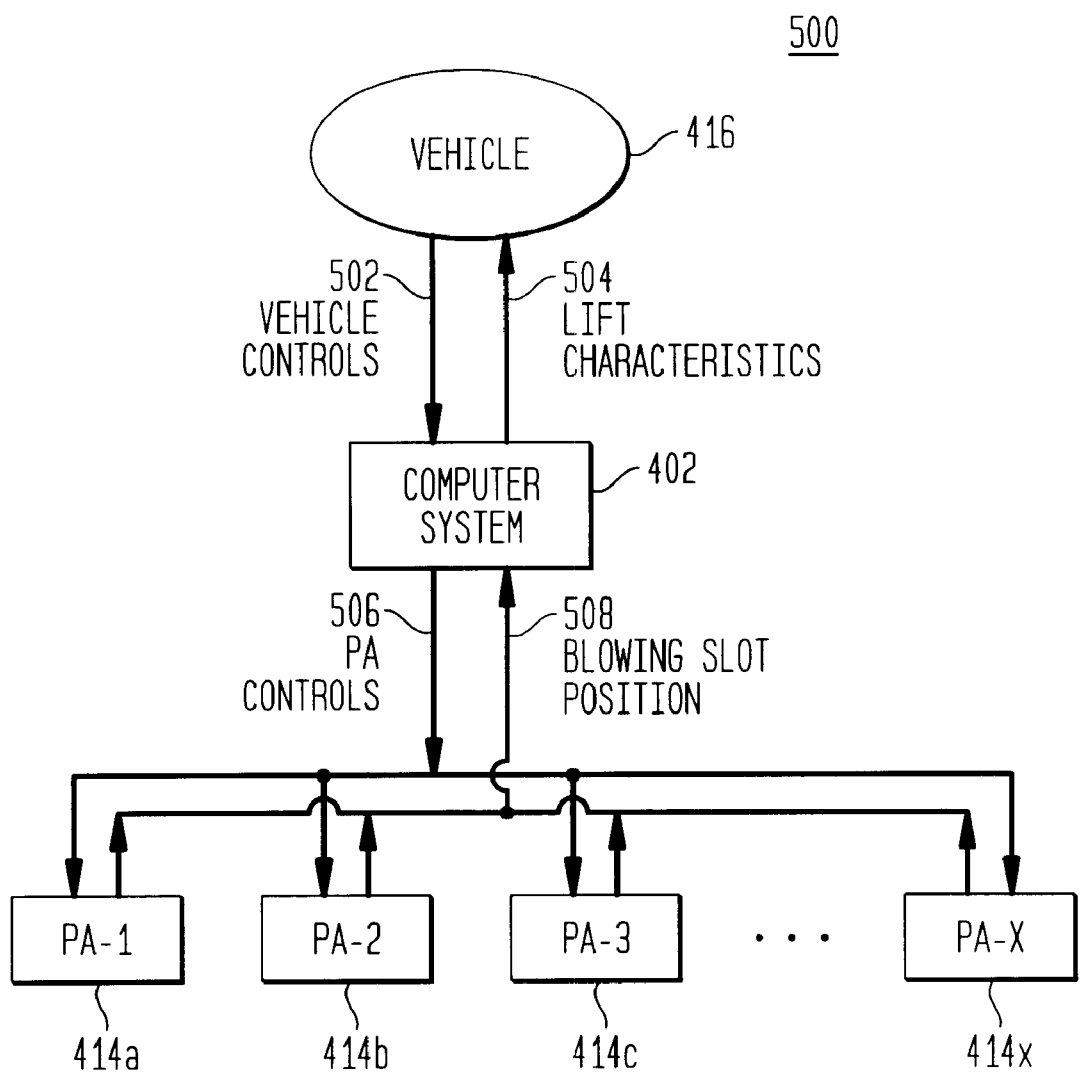
FIG. 5 is a data flow diagram showing the control of the dynamic fluid control surface.

FIG. 4 is a block diagram illustrating an exemplary computer system 402 as used in a vehicle having a dynamic fluid control surface 100 of the present invention, and FIG. 5 is a data flow diagram illustrating the data shared between the different components of the present invention.

A vehicle 416, e.g., a helicopter, incorporating a dynamic fluid control surface 100 is connected to a computer system 402 via a first communications bus 404 and the computer system 402 is then connected to the piezoelectric actuators 414a–x of the present invention via a second communications bus 412. The computer system 402 is described in greater detail below.

Operationally, the vehicle 416 sends vehicle controls 502 to the computer system 402. The computer system 402 interprets these vehicle controls 502 and translates them into one or more piezoelectric controls (PA controls) 506. The computer system 402 transmits these PA controls 506 to the appropriate piezoelectric actuators 414a–x. In return, the blowing slot position 508 is sent back to the computer system 402. The computer system 402 then returns the blowing slot position 508 back to the vehicle 416 as part of the lift characteristics 504 of the dynamic fluid control surface 100 so that it can be reported to the pilot.

The chosen embodiment of the computer system 402 comprises both hardware and software executing within the computer system 402. In fact, in one embodiment, the invention is directed toward one or more computer systems 402 capable of carrying out the functionality described herein.

An example of a computer system 402 is shown in FIG. 4. The computer system 402 includes one or more processors, such as processor 406. The processor 406 is connected to an internal bus 418. Various hardware/software embodiments are described in terms of this exemplary computer system 402. After reading this description, it will become apparent to a person of ordinary skill in the relevant art(s) how to implement the invention using other computer systems and/or computer architectures.

The computer system 402 is an embedded system that is located with a dynamic fluid control surface 100 of a vehicle 416. It includes a main memory 408, preferably random access memory (RAM), and may also include a secondary memory 410. The secondary memory 410 may include, for example, a hard disk drive. In alternative embodiments, secondary memory 410 may include other similar means for allowing computer programs or other instructions to be loaded into the computer system 402, such as a memory chip such as EPROM or PROM.

In this document, the term "computer program medium" and "computer readable medium" are used to generally refer to media such as main memory 408 and secondary memory 410. These "computer program products" are means for providing software to the computer system 100. Portions of the present invention are directed to such computer program products.

In operation, computer programs (also called computer control logic) are stored in main memory 408 and/or secondary memory 410. Such computer programs, when executed, enable the computer system 402 to perform the features of the present invention as discussed herein. In particular, the computer programs, when executed, enable the processor 406 to perform the features of the present invention. Accordingly, such computer programs represent controllers of the computer system 402.

In an embodiment where the invention is implemented using software, the software may be stored in a computer program product and loaded into computer system 402. The software, when executed by the processor 406 causes the processor 406 to perform the functions of the invention as described herein.

In another embodiment, the invention is implemented primarily in hardware using, for example, a hardware state machine, such as application specific integrated circuits (ASICS). Implementation of the hardware state machine so as to perform the functions described herein will be apparent to persons skilled in the relevant art(s).

In yet another embodiment, the invention is implemented using a combination of hardware and software.

The present invention is described in terms of a computer system 402 having a single processor 406 for convenience purposes only. It would be readily apparent, however, to one skilled in the relevant arts to use a computer system 402 having multiple processors 406, thereby executing the present invention in parallel.

Enough detail and disclosure has been provided that would enable one of ordinary skill in the relevant art(s) to design, manufacture, and operate a dynamic fluid control surface 100 of the present invention using piezoelectric actuators 112*a–x* as described herein. Specifically, piezoelectric actuators 112*a–x* and computer systems 402 are well known in the relevant art(s) and are commercially available. It would be readily apparent for one of ordinary skill in the relevant art(s) to design and operate a computer system 402, comprising hardware and software, that controls one or more piezoelectric actuators 112*a–x* in a dynamic fluid control surface 100 as described herein.

CONCLUSION

While various embodiments of the present invention have been described above, it should be understood that they have been presented by the way of example only, and not limitation. It will be understood by those skilled in the art that various changes in form and details may be made therein without departing from the spirit and scope of the invention as defined. Thus, the breadth and scope of the present invention should not be limited by any of the above-described exemplary embodiments.

What is claimed is:

1. A dynamic fluid control surface of a vehicle, comprising:
   a dynamic fluid control surface having an internal chamber containing a pressurized fluid, a first edge, a second edge, an exterior surface, and one or more blowing slots positioned along the first edge, each said blowing slot having an opening in said exterior surface of said dynamic fluid control surface, wherein said internal chamber is connected to said one or more blowing slots;
   one or more piezoelectric actuators wherein each said piezoelectric actuator is mounted directly adjacent to one said opening of one said blowing slot such that the location of said piezoelectric actuator enhances the control of fluid through said blowing slot; and
   a means for controlling said one or more piezoelectric actuators, wherein when said means for controlling is engaged, said piezoelectric actuators cause a change in the flow of said fluid through said one or more blowing slots.

2. The dynamic fluid control surface according to claim 1, wherein the vehicle is a rotorcraft.

3. The dynamic fluid control surface according to claim 2, wherein the dynamic fluid control surface is a rotor blade.

4. The dynamic fluid control surface according to claim 3, wherein said means for controlling said one or more piezoelectric actuators engages said one or more piezoelectric actuators to allow said fluid to pass through said one or more blowing slots during a portion of a rotation of the rotor blade and engages said one or more piezoelectric actuators to restrict the flow of said fluid through said one or more blowing slots during a second portion of the rotation of the rotor blade.

5. The dynamic fluid control surface according to claim 1, wherein the fluid is selected from the group of an exhaust gas, a compound gas, and air.

6. The dynamic fluid control surface according to claim 1, comprising a plurality of said piezoelectric actuators, and said means for controlling said piezoelectric actuators regulates said piezoelectric actuators in concert.

7. The dynamic fluid control surface according to claim 1, comprising a plurality of said piezoelectric actuators, and said means for controlling said piezoelectric actuators regulates each said piezoelectric actuator independently.

8. The dynamic fluid control surface according to claim 1, comprising a single blowing slot having a length equal to about the length of the dynamic fluid control surface.

9. The dynamic fluid control surface according to claim 1, comprising a plurality of blowing slots positioned in one or more rows along said first edge.

10. The dynamic fluid control surface according to claim 1, wherein said means for controlling said one or more piezoelectric actuators comprises:
    a means for varying the size of the opening of each said blowing slot; and
    a means for determining an open time period for allowing fluid to pass through said one or more blowing slots.

11. The dynamic fluid control surface according to claim 10, further comprising one or more jets and said means for controlling said one or more piezoelectric actuators further comprises a means for directing said jets in the dynamic fluid control surface to alter the pitch of the dynamic fluid control surface.

12. The dynamic fluid control surface according to claim 1, wherein said piezoelectric actuators are attached to the dynamic fluid control surface such that when said means for controlling is engaged, said piezoelectric actuators change the size of said opening of said blowing slots.

13. The dynamic fluid control surface according to claim 1, wherein said opening of said blowing slot is a pre-defined fixed size and said piezoelectric actuators are positioned between said internal chamber and said blowing slot such that when said means for controlling is engaged, said piezoelectric actuators change the flow of fluid prior to the flow of fluid passes through said blowing slot.

14. The dynamic fluid control surface according to claim 1, wherein said piezoelectric actuators are adjacent to and in communication with said openings of said blowing slots, such that when said piezoelectric actuators are engaged, said piezoelectric actuators change the size of said openings of said blowing slots.

15. The dynamic fluid control surface according to claim 1, wherein each said blowing slot further comprises a movable flap that covers and uncovers said opening of said blowing slot.

16. The dynamic fluid control surface according to claim 15, wherein each said piezoelectric actuator is attached to one said movable flap.

17. The dynamic fluid control surface according to claim 15, wherein one or more said piezoelectric actuators are integrated with one said movable flap into a single component such that said one or more said piezoelectric actuators cover and uncover said opening of one said blowing slot.

18. A dynamic fluid control surface of a vehicle, comprising:
- a dynamic fluid control surface having an internal chamber containing a pressurized fluid, a first edge, a second edge, and one or more blowing slots positioned along the first edge, each said blowing slot having an opening, wherein said internal chamber is connected to said one or more blowing slots;
- one or more piezoelectric actuators mounted in proximity to said one or more blowing slots;
- a means for controlling said one or more piezoelectric actuators, wherein when said means for controlling is engaged, said piezoelectric actuators cause a change in the flow of said fluid through said one or more blowing slots; and
- a means for de-icing said dynamic fluid control surface.

19. A dynamic fluid control surface of a vehicle, comprising:
- a dynamic fluid control surface having an internal chamber containing a pressurized fluid, a first edge, a second edge, and one or more blowing slots positioned along the first edge, each said blowing slot having an opening, wherein said internal chamber is connected to said one or more blowing slots;
- one or more piezoelectric actuators mounted in proximity to said one or more blowing slots;
- a means for controlling said one or more piezoelectric actuators, wherein when said means for controlling is engaged, said piezoelectric actuators cause a change in the flow of said fluid through said one or more blowing slots; and
- a reserve supply of fluid, wherein said reserve supply of fluid is connected to said one or more blowing slots and a flow of said reserve supply of fluid through said one or more blowing slots is regulated by said means for controlling said piezoelectric regulators.

20. A dynamic fluid control surface of a vehicle, comprising:
- a dynamic fluid control surface having an internal chamber containing a pressurized fluid, a first edge, a second edge, and one or more blowing slots positioned along the first edge, each said blowing slot having an opening, wherein said internal chamber is connected to said one or more blowing slots;
- one or more piezoelectric actuators mounted in proximity to said one or more blowing slots;
- a means for controlling said one or more piezoelectric actuators, wherein when said means for controlling is engaged, said piezoelectric actuators cause a change in the flow of said fluid through said one or more blowing slots; and
- one or more second blowing slots positioned along said second edge, wherein said internal chamber is connected to said one or more second blowing slots, one or more second piezoelectric actuators is mounted in proximity to said one or more second blowing slots, and a means for controlling said one or more second piezoelectric actuators, wherein when said means for controlling said one or more second piezoelectric actuators is engaged, said second piezoelectric actuators cause a change in the flow of said fluid through said one or more second blowing slots.

21. The dynamic fluid control surface according to claim 20, comprising a single second blowing slot having a length equal to about the length of the dynamic fluid control surface.

22. The dynamic fluid control surface according to claim 20, comprising a plurality of second blowing slots positioned in one or more rows along said second edge.

23. The dynamic fluid control surface according to claim 20, wherein when said means for controlling said one or more piezoelectric actuators allows fluid to pass through said first blowing slots, said means for controlling said one or more second piezoelectric actuators restricts fluid to pass through said second blowing slots.

24. The dynamic fluid control surface according to claim 20, wherein when said means for controlling said one or more second piezoelectric actuators allows fluid to pass through said second blowing slots, said means for controlling said one or more piezoelectric actuators restricts fluid to pass through said blowing slots.

25. A dynamic fluid control surface of a vehicle, comprising:
- a dynamic fluid control surface having an internal chamber containing a fluid, a first edge, a second edge, one or more first blowing slots positioned along the first edge, and one or more second blowing slots positioned along the second edge, wherein said internal chamber is connected to said one or more first blowing slots and to said one or more second blowing slots;
- one or more first piezoelectric actuators mounted in proximity to said one or more first blowing slots;
- one or more second piezoelectric actuators mounted in proximity to said one or more second blowing slots;
- a means for controlling said one or more first piezoelectric actuators, wherein when said means for controlling is engaged, said first piezoelectric actuators cause a change in the flow of said fluid through said one or more first blowing slots; and
- a means for controlling said one or more second piezoelectric actuators, wherein when said means for controlling is engaged, said second piezoelectric actuators cause a change in the flow of said fluid through said one or more second blowing slots.

26. The dynamic fluid control surface according to claim 25, wherein when said means for controlling said one or more first piezoelectric actuators allows fluid to pass through said first blowing slots, said means for controlling said one or more second piezoelectric actuators restricts fluid to pass through said second blowing slots.

27. The dynamic fluid control surface according to claim 25, wherein when said means for controlling said one or more second piezoelectric actuators allows fluid to pass through said second blowing slots, said means for controlling said one or more first piezoelectric actuators restricts fluid to pass through said first blowing slots.

28. The dynamic fluid control surface accordingly to claim 25, wherein each said first blowing slot further comprises a first movable flap that covers and uncovers said first opening of said first blowing slot and each said second blowing slot further comprises a second movable flap that covers and uncovers said second opening of said second blowing slot.

29. The dynamic fluid control surface according to claim 28, wherein each said first piezoelectric actuator is attached to one said first movable flap.

30. The dynamic fluid control surface according to claim 28, wherein each said second piezoelectric actuator is attached to one said second movable flap.

31. The dynamic fluid control surface according to claim 28, wherein one or more said first piezoelectric actuators are integrated with one said first movable flap into a single component such that said one or more said first piezoelectric actuators cover and uncover said first opening of one said first blowing slot.

32. The dynamic fluid control surface according to claim 28, wherein one or more said second piezoelectric actuators are integrated with one said second movable flap into a single component such that one or more said second piezoelectric actuators cover and uncover said second opening of one said second blowing slot.

33. A method for controlling a dynamic fluid control surface of a vehicle, the method comprising the step of:
   a. engaging one or more piezoelectric actuators, wherein each said piezoelectric actuator is mounted directly adjacent to an opening of a blowing slot wherein said blowing slot is positioned along a first edge of the dynamic fluid control surface and connected to an internal chamber containing a pressurized fluid and said opening of said blowing slot is through an exterior surface of the dynamic fluid control surface, such that the location of each said piezoelectric actuator enhances the control of fluid through said blowing slot.

34. The method according to claim 33, wherein said step (a) increases the rate and amount of fluid through said blowing slot.

35. The method according to claim 33, wherein said step (a) restricts the rate and amount of fluid through said blowing slot.

36. The method according to claim 25, wherein said step (a) changes the size of said opening of said blowing slot.

37. The method according to claim 33, wherein said step (a) engages the piezoelectric actuators in concert.

38. The method according to claim 33, wherein said step (a) engages each piezoelectric actuator independently.

39. The method according to claim 33, wherein the dynamic fluid control surface further comprises one or more jets, the method further comprising the step of:

(b) directing the jets in the dynamic fluid control surface to alter the pitch of the dynamic fluid control surface.

40. The method according to claim 33, wherein the dynamic fluid control surface is a rotor blade, the vehicle is a rotorcraft and said step (a) comprises the steps of:
   (i) engaging said one or more piezoelectric actuators to allow the fluid to pass through said opening of said blowing slot during a portion of a rotation of the rotor blade; and
   (ii) engaging said one or more piezoelectric actuators to restrict the flow of the fluid through said opening of said blowing slots during a second portion of the rotation of the rotor blade.

41. The method according to claim 33, further comprising the step of:
   (b) engaging a movable flap that covers and uncovers said opening of said blowing slot, wherein each of said piezoelectric actuators is adjacent to and in communication with said movable flap.

42. The method according to claim 41, wherein each said piezoelectric actuator is attached to said movable flap.

43. The method according to claim 41, wherein each of said one or more piezoelectric actuators is integrated with said movable flap, thereby being a single component.

44. A method for controlling a dynamic fluid control surface of a vehicle, the method comprising the steps of:
   (a) engaging one or more piezoelectric actuators, mounted in proximity to one or more blowing slots positioned along a first edge of the dynamic fluid control surface and connected to an internal chamber containing a pressurized fluid, to change a rate and amount of the fluid through the one or more blowing slots; and
   (b) de-icing the dynamic fluid control surface.

* * * * *